July 1, 1969         R. J. WERTEPNY, SR         3,453,651
BLADE-TYPE CUTTING IMPLEMENTS AND METHOD OF MANUFACTURE
Filed Oct. 19, 1966                              Sheet 1 of 2
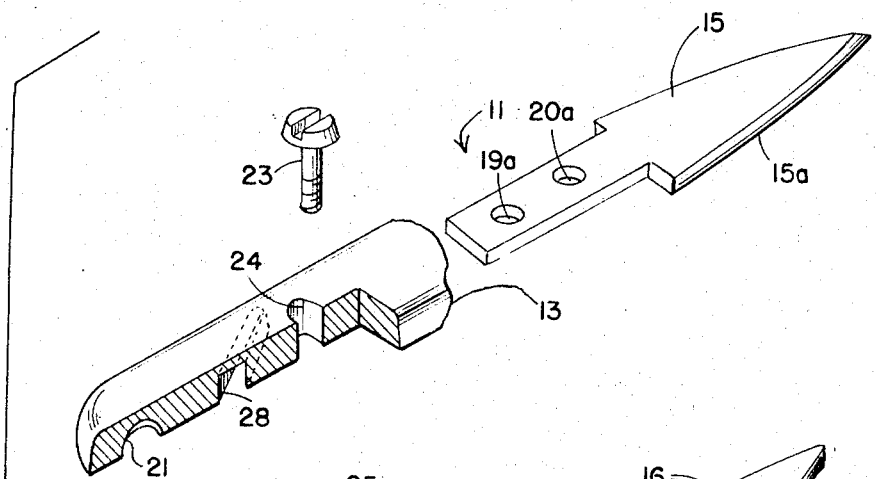
FIG.1
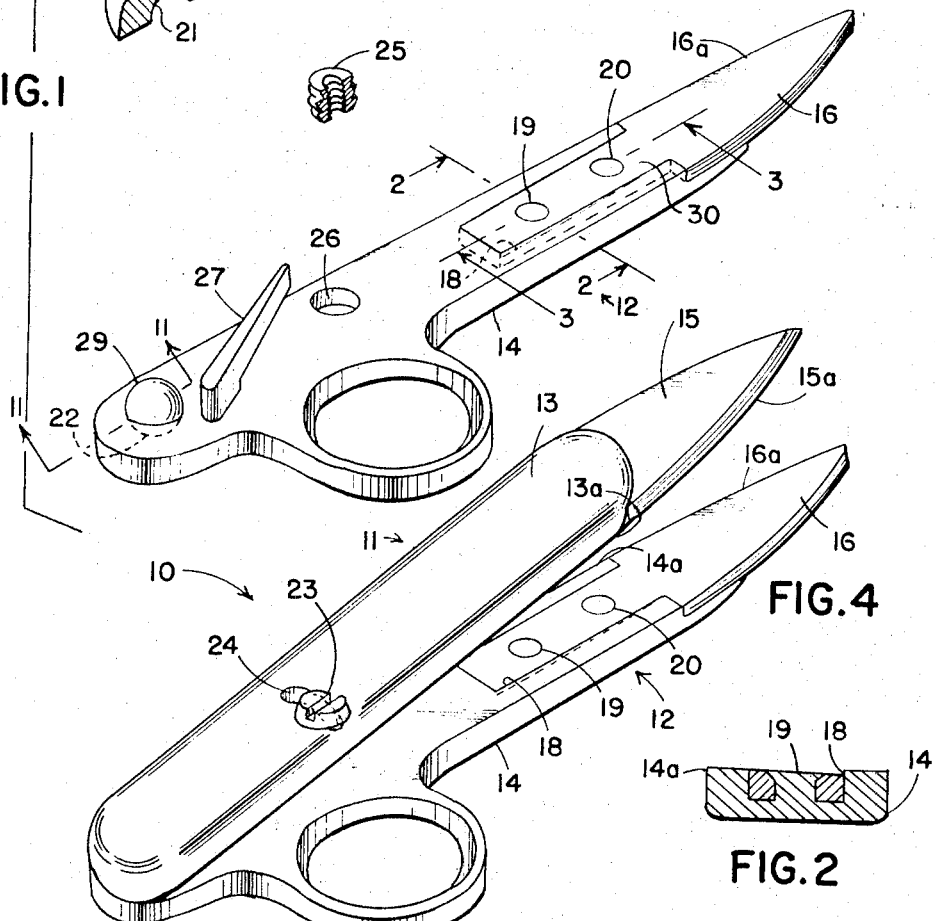
FIG.4
FIG.2
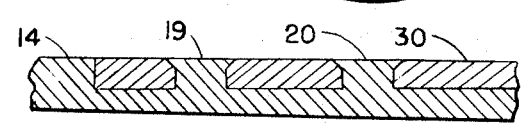
FIG.3
INVENTOR.
Rudolph J. Wertepny, Sr.
by Sparrow and Sparrow
ATTORNEYS.

July 1, 1969  R. J. WERTEPNY, SR  3,453,651
BLADE-TYPE CUTTING IMPLEMENTS AND METHOD OF MANUFACTURE
Filed Oct. 19, 1966

*INVENTOR.*
Rudolph J. Wertepny, Sr.

by Sparrow and Sparrow

ATTORNEYS.

United States Patent Office 3,453,651
Patented July 1, 1969

3,453,651
BLADE-TYPE CUTTING IMPLEMENTS AND
METHOD OF MANUFACTURE
Rudolph J. Wertepny, Sr., West Orange, N.J., assignor to
J. Wiss and Sons Co., Essex County, N.J., a corporation of New Jersey
Filed Oct. 19, 1966, Ser. No. 587,916
Int. Cl. B26b 13/00
U.S. Cl. 30—253    3 Claims

ABSTRACT OF THE DISCLOSURE

A blade-type cutting tool with a body member into which straight, flat cutting blades are inserted. The recesses for the blades are made with a certain lateral and longitudinal inclination at a certain angle to give the blades a desired cross-over and clearance angularity for proper cutting.

---

The invention relates generally to blade-type cutting implements and their method of manufacture, and more particularly has reference to thread cutters or clips, such as are being used in the garment industry, as well as scissors, shears, snips, individual blades and like cutting implements.

The invention consists in such novel features, construction arrangements, combinations of parts and improvements as may be shown and described in connection with the cutting tools herein disclosed by way of example only and as illustrative of preferred embodiments.

Objects and advantages of the invention will be set forth in part hereafter and in part will be obvious herefrom or may be learned by practicing the invention, the same being realized and attained by means of the instrumentalities and combinations pointed out in the appended claims.

Heretofore, blade-type cutting tools, such as blade-type cutters, scissors, shears, snips and the like implements have been made with a twist in the blades between the fulcrum or pivot and the forward ends of the blades, so that, viewed in a vertical plane a consistantly increasing angle between the two blades exists, starting from the fulcrum or pivot to their forward ends. In addition, the blades are bowed from the fulcrum or pivot to the forward ends of the blades so that, viewed from the top of the implement, when the blades are fully opened and the cutting edges are engaged near the fulcrum, the forward ends of the blades appear to overlap each other by an appreciable amount because of a constantly increasing bend from the fulcrum to the forward ends or tips of the blades.

It is an object of the present invention to provide blade-type cutting implements in which the blades have neither a twist nor a bow, yet provide the proper angularity for both cross-over and clearance of the blades.

Furthermore, it is an object of the present invention to provide a blade-type cutting implement having flat cutting blades in association with corresponding novel body members or backings.

A still further object of the present invention is to provide the foregoing type of cutting implement in which the proper angularity for both cross-over and clearance is molded into a plastic or metal backer, the flat blade being snapped over protrusions provided in the blade material and spin-welded or heat-welded in place.

Another object of the present invention is to provide a method for producing the aforementioned cutting implement including the steps for setting and maintaining the blades in their proper relationship.

A further object of the present invention is to provide blade-type cutting implements having flat, non-twisted metal cutting blades secured to a body made of plastic, metal or other suitable material.

Yet another object of the present invention is to provide new and improved blade-type cutting implements which can be manufactured economically while retaining the properties of a precision tool.

Various further and more specific objects, features and advantages will clearly appear from the detailed description given below taken in connection with the accompanying drawings which form part of this specification and illustrate merely by way of examples embodiments according to the invention. In the following description and in the claims, parts will be identified by specific names for convenience, but such names are intended to be as generic in the application to similar parts as the art will permit. Like reference characters denote like parts in the several figures of the drawing, in which:

FIG. 1 is an exploded view of a blade-type cutting implement according to the invention, the top portion being partially cut away;

FIG. 2 is a section through 2—2 of the lower blade seen in FIG. 1;

FIG. 3 is a section through 3—3 of the lower blade seen in FIG. 1;

FIG. 4 is a perspective view of the cutting implement of FIG. 1 assembled;

Figure 5:
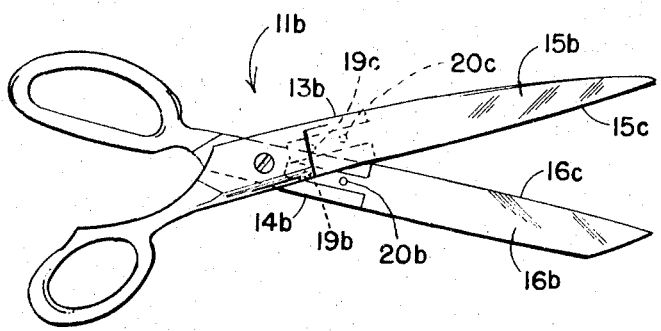
FIG. 5 is a view of another blade-type cutting implement, such as a pair of shears or scissors according to the invention.
Figure 6:
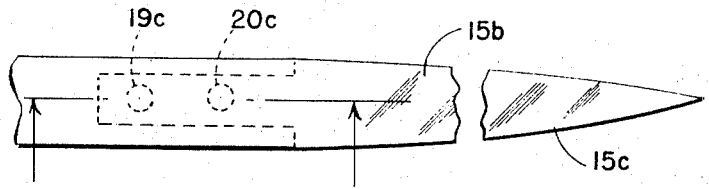
FIG. 6 is a detail fragmentary view of the upper blade assembly seen in FIG. 5.
Figure 7:
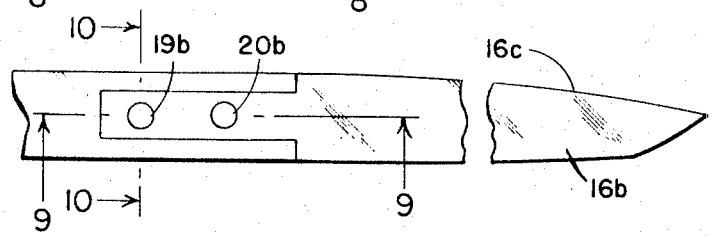
FIG. 7 is a detail fragmentary view of the lower blade assembly seen in FIG. 5.
Figure 8:
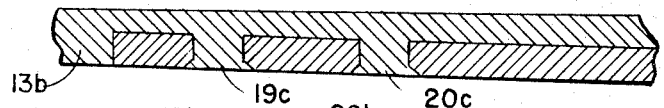
FIG. 8 is a detail section through 8—8 of FIG. 6.
Figure 9:
FIG. 9 is a detail section through 9—9 of FIG. 7.
Figure 10:
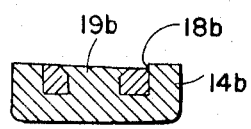
FIG. 10 is a detail section through 10—10 of FIG. 7.

Referring now in more detail to the drawing illustrating an embodiment by which the invention may be realized, there is shown in FIG. 1 an exploded view of a blade-type cutting implement which, by way of example only, is in the form of a thread cutter or clip, such as that used in the garment industry, and which embodies the principle of the invention.

FIG. 4 is a perspective view of the cutting implement of FIG. 1, assembled, and which is designated generally by the numeral 10. For purposes of clarity, blades 11 and 12 of implement 10 are shown opened wider with respect to each other than they would be in normal use. In normal use, they would open only to expose cutting edges 15a and 16a. Numeral 11 indicates the upper blade assembly or unit, and the numeral 12 indicates the lower blade assembly or unit depicted in the drawing.

Lower blade assembly or unit 12 comprises a body member 14, which may be made of suitable metal or of plastic, and a cutting blade member 16 made of metal which has a reduced or narrower extension or shank portion 30. The reference 16a represents the cutting edge. A recess or socket 18 is provided in body member 14 which is inclined or angular in both transverse and longitudinal sections (FIGS. 2 and 3). Longitudinal recess or socket 18 extends to the forward end of body member 14, and in its narrower portion is provided with spaced studs or protuberances 19 and 20. The shank portion 30 of blade member 16 has a pair of perforations within which fit studs 19 and 20. Blade member 16 is permanently secured to body member 14 at said studs by spin-welding (in case body member 14 is made of metal) or by heat-welding (in case body member 14 is made of plastic) or by any other suitable means. The perforations of blade member 16 have a slight countersink into which the spin- or heat-weld displacement of the backing material travels so as to retain the blade in position.

The construction of upper blade assembly generally indicated by the numeral 11 is similar to that with respect to lower blade assembly 12, except that the transverse and longitudinal slopes are to opposite hand. The parts are made of similar material. In upper blade assembly 11 the corresponding parts seen are indicated as follows: body member 13, cutting blade member 15 with cutting edge 15a, perforations 19a, 20a for the corresponding studs or protuberances similar to 19, 20. The blade portions having the cutting edges 15a, 16a protrude from the respective body members 13, 14.

Each of blade members 15 and 16 is made of straight, flat cutting steel or other suitable material and does not have any twist or bow, the longitudinal recesses or sockets (only 18 seen) being provided in such angular shape or inclination that the necessary cross-over and clearance of blade members 11 and 12 are provided for therein. The proper angular shape or inclination is achieved by choosing an angled tangent at the correct position on a sphere of a size to give the required amount of twist and bow.

Thus, with respect to the lower blade assembly, the recess 18, located at the forward portion of body member 14, slopes upwardly in lateral and longitudinal directions, that is, inclines transversely of the body member 14 towards the edge 14a of body member 14 and longitudinally towards the forward end thereof. Consequently, blade 16, following the inclination of obliqueness of recess 18, likewise slopes or slants upwardly laterally in the direction of the cuttings edge 16a of blade member 16 and longitudinally in the direction of its tip. Similarly, but to opposite hand, and with respect to the upper blade assembly, the recess accommodating blade member 15 slopes or inclines downwardly in lateral or transverse and longitudinal directions, that is, towards the edge 13a of body member 13 and longitudinally towards the forward end thereof. Consequently, blade 15 likewise slopes or inclines downwardly laterally in the direction of its cutting edge 15a and longitudinally in the direction of its tip. Thus, the recesses or sockets are formed in such manner that they provide suitable rests or retainers for blade members 11 and 12 against transverse forces which are the largest forces present in this type of cutting tool. Obviously, both said recesses and blade members are provided with close tolerances in order to warrant proper operating relationship between the cutting edges of blade members 11 and 12. Thus, the method according to the invention provides for setting and keeping the blade members in the proper operating relationship. The fulcrum and blade arrangement herein provided is such that the blade members have no twist and no bow; the proper angularity for both cross-over and clearance is provided in the plastic or metal body member, the flat blade member being snapped over the two studs or protuberances of the body member and spin-welded or heat-welded in place. The shank of the corresponding blade member which fits into the corresponding recess or socket molded or otherwise formed in the body member, may be punched or otherwise formed such as to provide close tolerances so that the blade member may assume the proper angle relationships with its mating counterpart.

It is understood that, in the event it is convenient or desirable to use recesses or sockets of uniform section (that is, not sloped), the desired transverse and/or lateral sloping or slanting of the blade members 15, 16 may be accomplished by employing transversely sloping inserts between the blade members and the bottoms of the recesses, respectively, or providing the blade members per se with the desired sloping or slanting sections or portions.

FIGS. 1 through 4 show a device with a ball pivot, while FIG. 5 shows a device with a conventional screw pivot. It is understood that this invention performs equally well with these or any other type pivot. The ball pivot device consists of a ball-shaped member 29 which is half-and-half inserted in cup-shaped cavities 21 (upper body member 13) and 22 (lower body member 14). In order to tighten blades 15 and 16, a threaded insert 25 is anchored in a bore 26 in the lower body member 14 and a screw 23 is inserted through a bore 24 in the upper body member 13. Screw 23 fits in insert 25 and can be tightened thereon at will. An elastic bar 27 is fastened in lower body member 14 and a corresponding recess 28 is provided in upper body member 13. Elastic bar 27 fits in recess 28 and acts as a spring member for opening the cutting blades 15, 16.

FIGS. 5 to 10 inclusive depict a blade-type cutting implement, such as scissors or shears 11b embodying the principles of the invention with reference to the blade assemblies. The upper blade assembly or unit comprises body member 13b and cutting blade member 15b and lower blade assembly comprises body member 14b and cutting blade member 16b. The references 15c, 16c indicate the cutting edges of the respective blade members. The references 19c, 20c indicate the studs or protuberances in the upper body member 13b and the references 19b, 20b indicate the studs or protuberances on the lower body member 14b which are received in corresponding perforations in the respective blade members 15b, 16b. The reference 18b corresponds to the reference 18 with respect to FIGS. 1 to 4.

While the invention has been described and illustrated with respect to certain preferred examples which give satisfactory results, it will be understood by those skilled in the art after understanding the principle of the invention that various changes and modifications may be made without departing from the spirit and scope of the invention, and it is intended therefore in the appended claims to cover all such changes and modifications.

I claim:

1. A cutting tool comprising a pair of cooperating blade units having a common pivot point, each of said blade units comprising a body member and a cutting blade member, a longitudinal recess in the forward portion of said body member, said blade member having a part secured in said recess and a part projecting from said forward portion of said body member, said projecting part of said blade member having a cutting portion; said recesses and said blade members having angular inclinations along both their length and width, said inclinations arranged in opposite directions against each other, respectively, providing cross-over and clearance angularity of said cutting portions for a cutting operation.

2. A cutting tool according to claim 1, and wherein said recess and said secured part of said blade member of each of said blade units have contacting faces and at least one of said faces is inclined transversely and longitudinally providing said inclinations of said cutting portions.

3. A cutting tool comprising a pair of blade units having a common pivot, blade tension adjustment means, spring means for urging said units apart; each of said units comprising a body member having a recess, said recess having an upwardly inclined slope at a specific angle in both the direction transversely of said body member and in the direction longitudinally towards the front end thereof, and straight, flat blade members each having a portion inserted in said recess and having a cutting portion.

References Cited

UNITED STATES PATENTS

| 879,064 | 2/1908 | Prohaska | 30—260 |
| 1,913,958 | 6/1933 | Rieff | 30—235 |
| 2,082,502 | 6/1937 | McCaw | 30—349 |
| 2,269,764 | 1/1942 | Gutman | 30—234 |
| 2,666,258 | 1/1954 | Vogel | 30—349 |
| 2,852,846 | 9/1958 | Ahlbin | 30—341 |

ROBERT C. RIORDON, Primary Examiner.

J. C. PETERS, Assistant Examiner.

U.S. Cl. X.R.

30—254, 344